Nov. 23, 1948.    D. E. SUNSTEIN    2,454,355
ELECTRIC MOTOR CONTROL SYSTEM
Filed July 7, 1945    3 Sheets-Sheet 1

INVENTOR.
DAVID E. SUNSTEIN
BY Ostrolenk + Faber
ATTORNEYS

Nov. 23, 1948.　　　　D. E. SUNSTEIN　　　　2,454,355
ELECTRIC MOTOR CONTROL SYSTEM
Filed July 7, 1945　　　　　　　　　　　　　3 Sheets—Sheet 2

INVENTOR.
DAVID E. SUNSTEIN
BY
*Ostrolenk + Faber*
ATTORNEYS

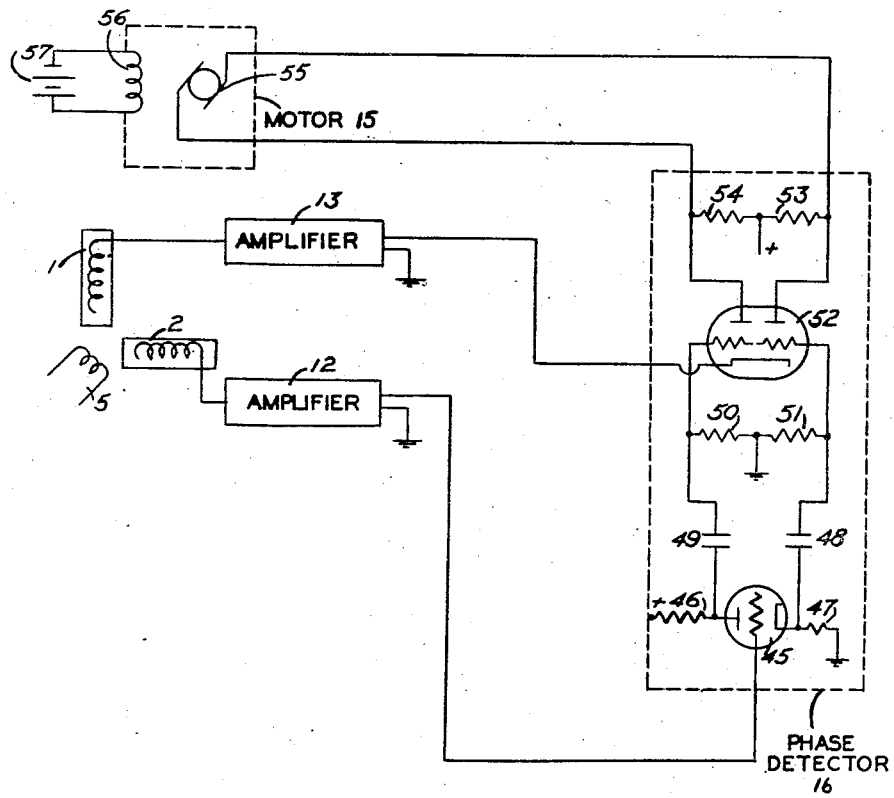

Patented Nov. 23, 1948

2,454,355

UNITED STATES PATENT OFFICE 2,454,355

ELECTRIC MOTOR CONTROL SYSTEM

David E. Sunstein, Elkins Park, Pa., assignor to Philco Corporation, a corporation of Pennsylvania Application July 7, 1945, Serial No. 603,604

14 Claims. (Cl. 318—31)

My invention relates to a power follower and more particularly relates to an electromagnetically-operated power follower.

In power followers heretofore devised, a comparatively large amount of power is required in the control mechanism per se, the mechanical advantage usually being small. This makes such systems relatively insensitive for small movements or for precision of movement. In many cases such as fire control, fine degrees of accuracy in the angle of rotation are required.

In accordance with a novel power follower mechanism which I have devised, I provide a mechanism for inducing a magnetic field and achieve a rotation as a function of the angle of direction of the magnetic field with respect to a predetermined direction. This is effected by the combination of a single or a pair of pick-up coils, a phase discriminator and a motor to drive the pick-up coils through a ring gear to which the wires are attached, all arranged for following any mechanical rotation.

To accomplish this, a small coil is wound on a transformer core. This coil is energized by a convenient signal such as an alternating current of 60 or 400 cycles. This small coil is fastened to a shaft which rotates about the same axis as the pick-up coils. Normally the core of the small coil is aligned with one of the pick-up coils and is rotatable for alignment with the gap of the other pick-up coil. The transformer core is open and completes the magnetic circuit of the pick-up coils when aligned with either of them.

Whenever the small magnetized coil moves from a predetermined zero position, signals are impressed from the phase detector on the motor in such a direction as to cause the motor to drive the ring gear carrying the pick-up coil or coils back to the neutral position. Accordingly, as the center magnetic coil rotates, the structure carrying the ring gear follows the motion of the shaft carrying the small magnetic coil.

Such a device has a distinct advantage over such devices as the Selsyn in that the power required for the shaft which rotates independently, is very small since the back reaction on the signal transformer core is slight. Although the power required to rotate the ring gear with the associated pick-up coils and possible other apparatus may be quite large, this power is supplied from the motor, not from the shaft which is giving the initial rotation.

Accordingly, an object of my invention is to provide a novel power follower.

A further object of my invention is to provide a novel means for utilizing the rotation of a magnetic field to achieve a power follower action.

Still another object of my invention is to provide a novel arrangement of power follower with a phase discriminator circuit.

Still a further object of my invention is to provide a novel power follower in which phase displacement of signals generated by a rotatable member is utilized for effecting a power follower action.

The invention will be clear from an inspection of the accompanying drawings in which:

Figure 3 shows a possible arrangement of the electronic circuits.

Figure 1:
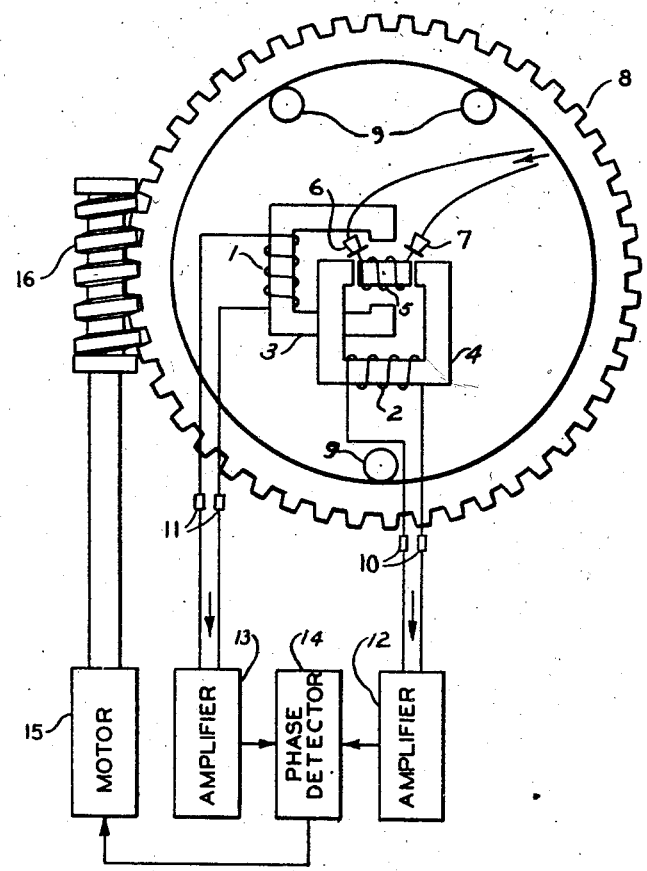
Figure 1 shows a diagram of the system with the electronic parts in block.

Referring to Figure 1, a small magnet 5, around which is wound a pick-up coil connected for suitable energization, is pivotally mounted for rotation, and the ring gear 8 is arranged to follow this motion. The two magnetic structures 3 and 4 are rigidly fastened to the ring gear 8, and around each of these magnetic structures there is wound a pick-up coil 1 and 2.

Coil 5 is energized through slip-rings 6 and 7 from a source of power which may be 60 cycles or 400 cycles or any other convenient frequency. This coil 5 is free to be rotated independently and by itself, requiring relatively minute power. The ring gear and the magnetic structure are so arranged in cooperation with electrical circuits explained hereinafter, that the ring gear follows the motion of the energized magnet coil 5.

Signals from the two pick-up coils 1 and 2 are taken from the ring gear through slip-ring arrangements 10 and 11. These slip-ring arrangements enable the ring gear to rotate continuously in one direction without causing any difficulties with the electrical circuit.

Signals from the pick-up coil 1 are fed into amplifier 13, and signals from the pick-up coil 2 are fed into amplifier 12. In the position shown, with the pole faces of magnet 3 at right angles to the pole faces of magnet 5, no signal is induced in winding 1, whereas full signal is induced in winding 2. Amplifiers 12 and 13 are thus so arranged that a large signal is fed into the phase detector 14 from amplifier 12, whereas a practically zero signal is fed in from amplifier 13 to phase detector 14 under circumstances of correct positioning of the ring gear. Under these circumstances, no signal is fed from the phase detector 14 to the motor 15, and consequently, the motor does not operate. In this condition, the system is in perfect balance.

Assume, however, that the coil 5 is rotated through any small angle. Under these circumstances the same voltage, approximately, or only slightly smaller voltage, is still induced in coil 2, and amplifier 12 operates as before and feeds a fairly large signal to the phase detector 14.

On the other hand, the fact that coil 5 has been rotated a few degrees will now cause a component of the flux in magnet 5 to flow through magnetic circuit 3, and consequently, a voltage will be induced in coil 1. This voltage is amplified in amplifier 13 and is fed into the phase detector 14. The phase detector 14 recognizes whether this is in phase or out of phase with the voltage which is fed from amplifier 12 and gives a proper signal to motor 15.

For example, if the two voltages are in phase, which may occur as a result of the coil 5 having been rotated clockwise, the signal from the phase detector 14 to the motor 15 is in such a direction as to cause the motor to rotate ring gear 8 in the corresponding follow-up clockwise direction. Motor 15 acting through the worm gear 16 and ring gear 8 drives the coil structures 3 and 4 in a clockwise direction to follow the motion of coil 5.

As soon as the ring gear has rotated to the position at which the original relative position of the pick-up coil 1 and coil 5 again obtains, and no voltage is induced in pick-up coil 1, no further signal is sent to the motor which therefore stops further rotation; and the system is again in balance at its new position with the ring gear in its follow-up position of coil 5.

If now, coil 5 should be displaced in a counterclockwise direction, the voltage induced in coil 1 will be out of phase 180° with respect to the voltage which was induced, due to a clockwise rotation. Through the action of the phase detector this will cause an opposite signal to be sent into motor 15 so that the motor 15 will rotate in the direction opposite to that in which it would rotate in the case when the coil 5 was rotated in the clockwise direction.

If again the coil 5 is rotated in counterclockwise direction, the signal from the phase detector to the motor is in such direction as to cause the ring gear to be further rotated in a counterclockwise direction until a balanced circuit condition obtains, thus again causing the ring gear to follow the motion of coil 5.

Thus a power follower is provided in which the motion of ring gear 8 will follow the motion of coil 5, and, furthermore, in doing this, practically no torque is imposed upon coil 5. The power to operate the ring gear is supplied to the motor through the electronic circuits.

Figure 2:
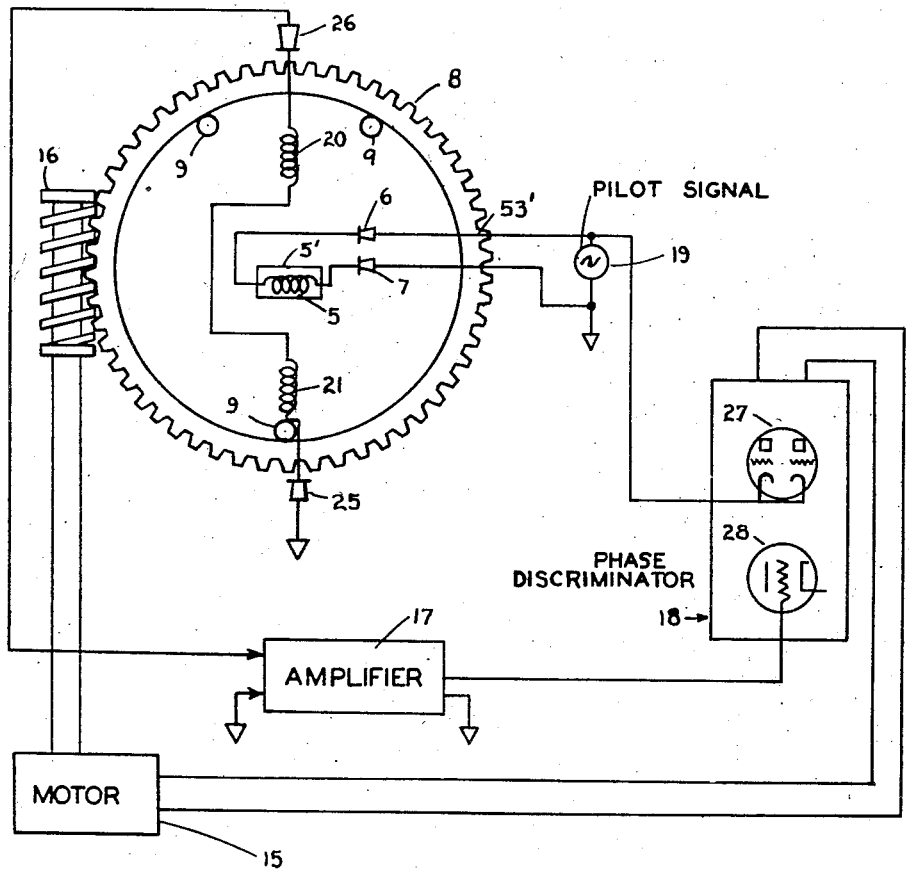
Figure 2 shows a modification of this system.

Figure 2 shows a variation of this system. In this figure, the energizable coil 5 is again pivotally mounted for rotation, and is again supplied through slip-rings 6 and 7 from a signal source 19. The pick-up coils, however, consist of a pair of coils 20 and 21 which are this time connected in series, and which replace in action coil 1 of Figure 1. The signals from coils 20 and 21 are fed out through slip-rings 25 and 26 to the external circuit into one end of an amplifier 17.

Amplifier 17, which corresponds to amplifier 13 in Figure 1, has its output fed into a phase detector or discriminator 18. Phase discriminator 18 is also supplied with a signal from the pilot signal 19. The output of the phase discriminator is fed to motor 15 which in turn operates gear 8 through worm gear 16.

Here again, as in the previous case, when coil 5 and coils 20 and 21 are at right angles to each other, no signal is picked up by coils 20 and 21. Consequently, no signal is fed into the phase discriminator 18 from amplifier 17. Consequently, there is no output from the phase discriminator to the motor 15, and no motion is apparent in ring gear 8.

However, if the coil 5 should be rotated in clockwise direction, a voltage of a predetermined phase is developed in coils 20 and 21. This is amplified in amplifier 17, and consequently, a voltage of a predetermined phase is impressed upon the grid of tube 28 in the phase discriminator 18.

This tube amplifies the signal and this amplified signal is then compared in the actual discriminator circuit involving double triode 27 with the pilot signal 19 which is fed in on the cathode of tube 27. The result of this comparison is an output signal which is fed to motor 15, this output signal having such a polarity that the ring gear 8 is rotated in a clockwise direction.

Similarly, if the energized coil 5 were rotated in the counter-clockwise direction, a voltage would be induced if coils 20 and 21 were in the opposite phase to the previous induction. Thus, the signal applied to tube 28 would be in the opposite phase and the output of the phase discriminator to the motor would be of the opposite polarity than before. This would cause the motor 15 to rotate in the opposite direction, and consequently, would cause ring gear 8 to be rotated in the counterclockwise direction.

In either of these two cases it is to be observed that the ring gear follows the motion of the coil 5, and again, the power for driving the ring gear is derived primarily from the electronic circuit, and does not come from the signal in coil 5 nor from mechanical torque placed upon this coil.

Figure 3 shows in more detail the arrangement of the phase detector, as applied to the embodiment shown in Figure 1. Energizing coil 5 is shown energizing both coils 1 and 2. These feed amplifiers 12 and 13 which in turn feed the phase detector at different points.

The signal from amplifier 12 feeds the amplifying tube 45 on its grid. This tube is arranged to have both cathode and plate resistors such that an output balanced to ground is sent into the detecting tube 52 through the blocking capacitors 48 and 49.

The two grid resistors 50 and 51 are equal and insure that the signals reaching the grid of tube 52 are balanced to ground with respect to D. C. A signal from amplifier 13 is fed in on the cathode of tube 52.

In this phase discriminator circuit the signals on the two grids are out of phase with respect to each other. The plate loads 53 and 54 of the tube are equal. Across the plates is connected the armature 55 of motor 15, the field of which is energized by a suitable D. C. source such as the battery 57.

Inasmuch as the armature is connected between the plates of the two triodes on tube 52, no signal will normally be applied to the armature, since the plate currents of the two halves of tube 52 are equal.

This occurs under the circumstances that the grid to cathode potentials of each half of tube 52 follow the same pattern. Thus, this occurs when no output is being obtained from amplifier 13, i. e., when no voltage is picked up in coil 1. However, if a voltage is picked up in coil 1, a signal is supplied by amplifier 13 to the cathode of tube 52. This voltage adds to the voltage on one of the grids and subtracts from the voltage on the other of the grids of tube 52 in view of the fact that the voltages on these two grids are 180° out of phase with respect to each other.

Accordingly, the D. C. component of current in one side of tube 52 is lowered, whereas the D. C. component of current in the other side of tube 52 is raised. This action takes place through the non-linear operation of the tube 52, which is either biased on a non-linear portion of its transfer characteristics, or else fed a large signal from tube 45 sufficient to cause non-linear operation.

It is further apparent that if the phase of the voltage picked up by coil 1 should be reversed, the unbalance of the plate circuit of tube 52 would also be reversed, because the reversal of phase of the input to the cathode would reverse the association with the phase of the voltages on the grid, and consequently the triode which previously would carry the lesser current would be the one which would carry the greater current. This would obviously reverse the current flow through the armature of motor 15.

It will now be clear from the above that when the phase of the voltage picked up by coil 1 is reversed, the polarity of the signal supplied to the motor is reversed. Furthermore, the field winding 56 of the motor is supplied with a fixed D. C. current by means of battery 57. Under these circumstances, if coil 5 should be deflected in one direction, the motor will cause the ring gear to rotate in a specified direction. This direction will be such that pick-up coils 1 and 2 rotate in the same direction in which coil 5 has been rotated.

Under these circumstances then, no matter how coil 5 is rotated, the motor 15 will cause ring gear 8 carrying coils 1 or 2 to be rotated in the same direction as coil 5 has been rotated. Thus, the ring gear tends to follow the motion, no matter how complicated, of coil 5.

It is apparent that, in view of the above detailed explanation of Figure 3, that Figure 2 previously described may incorporate a phase discriminator 18 and a motor 15 of a character similar to that shown in Figure 3 as phase discriminator 16 and motor 15.

Furthermore, it is apparent that in all the drawings, the functions of the coils may be interchanged. For example, the invention may be modified in that the ring gear 8 and the coils mounted thereto may be attached to the shaft whose motion is to be followed and in this case, the motion of such a shaft is duplicated by coil 5, which is mechanically arranged to be driven by motor 15.

Likewise, it is apparent that, if the motor 15 is a two phase A. C. motor, satisfactory operation may be obtained by a modification of Figures 1 or 2 in which embodiment of the invention the two phases of the motor are energized directly by the signals which in Figures 1 and 2 are fed into the phase detector or discriminator. In this variation of the invention, no phase discriminator need be used.

Since many other modifications of my invention are contemplated, I prefer my invention to be bound by the following claims.

I claim:

1. In a power follower, a first magnetic path having flux normally induced in a predetermined direction along said path, means for angularly moving said path to change the direction of said flux, a pair of magnetic paths having pole faces angularly disposed with respect to each other, said first magnetic path, when in a predetermined position being in operative relation with one of said pairs of magnetic paths, with the pole faces of each in opposed relation for completing a magnetic circuit therewith, said same first magnetic path being at the same time in non-operative relation with the other of said pair of magnetic paths with their pole faces in right angle relation, the flux in said first magnetic circuit dividing between said pair of magnetic paths as said first magnetic circuit is angularly moved to increase the flux flow from said first path to the second of said pair of paths and to decrease the flux flow from said first path to the first of said second pair of paths, a motor for rotating said pair of magnetic paths, and means controlled in accordance with the flux in each of said pair of magnetic paths for operating said motor to rotate said magnetic paths through an angle and in a direction determined by the change in direction of said flux in said first magnetic circuit.

2. In a power follower, a first magnetic path having flux normally induced in a predetermined direction along said path, means for angularly moving said path to change the direction of said flux, a pair of magnetic paths having pole faces angularly disposed at right angles with respect to each other, the flux in said first magnetic path dividing between said pair of magnetic paths in accordance with the angular position of each of said pair of magnetic paths with respect to said first magnetic path, a motor for rotating said pair of magnetic paths, and means controlled by the flux in said pair of magnetic paths for rotating said motor to effect a predetermined rotation of said pair of magnetic paths.

3. In a power follower, a magnetic path having flux normally induced in a predetermined direction, means for rotating said magnetic path, a first circuit including a winding so disposed with respect to said magnetic path that normally zero signal is induced in its winding by the flux in said magnetic path, a second circuit including a winding so disposed with respect to said magnetic path that normally maximum signal is induced in its winding by the flux in said magnetic path, and as said magnetic path is rotated, a signal voltage is induced in the winding of the first magnetic path, a phase detector connected to said first and second circuits, means including said circuits for energizing said phase detector in accordance with the change in direction of said flux, a motor connected in the output of said phase detector, said circuit connections being such that with no signal induced in the winding of the first magnetic path, no current flows in the output of the phase detector and as signal is induced in the winding of the first magnetic path, the phase detector is energized and current flows in its output circuit for effecting a rotation of said motor in a direction and through an angle which is a function of the change of direction of said flux in said magnetic path.

4. In a power follower, a first magnetic path pivotally mounted for rotation, means for effecting an angular rotation of said magnetic path, a pair of magnetic paths having pole faces disposed at right angles with respect to each other, said first magnetic path being common to said pair of magnetic paths, and being normally disposed in alignment with one of said pairs of magnetic paths and at right angles to the other of said pair of magnetic paths, the component of the flux in the first magnetic path which is in each of the pair of magnetic paths being a function of their angular positions with respect to said first magnetic path, a phase detector, circuit connections for energizing said detector in accordance with the proportion of flux in each of said pair of magnetic paths, said phase detector being de-energized when said first magnetic path is in right angle relation with said other of said magnetic paths, a motor, mechanical connections from said motor for rotating said pair of magnetic paths, and circuit connections from the output of said phase detector to said motor for energizing said motor to rotate said pair of magnetic paths in a direction to follow the angular rotation of said first magnetic path.

5. In a power follower, a first magnetic path having flux normally induced in a predetermined direction, means for changing the direction of said flux, a pair of magnetic paths having pole faces angularly disposed with respect to each other, the pole faces of one of said pair of magnetic paths and the pole faces of said first magnetic path being normally in operative relation, with the pole faces of each directly opposed for completing a magnetic circuit therewith, a phase detector, means energized by the flux in said pair of magnetic paths for operating said phase detector, a motor for rotating said pair of magnetic paths, circuit connections from the output of said phase detector to said motor, and means including circuit connections whereby the output of said phase detector is zero when said one of said pair of magnetic paths is in its normal position with its pole faces directly opposite the pole faces of said first magnetic path.

6. In a power follower, a first magnetic path having an energizing winding, said winding being pivotally mounted for rotation, a source of signal energy for effecting an angular rotation of said magnetic path, a pair of magnetic paths disposed at right angles with respect to each other, a common support for said magnetic paths, one of said pair of magnetic paths and said first magnetic path being normally in operative relation with the pole faces of each directly opposed for completing a magnetic circuit therewith, and being normally in non-operative relation with the other of said pair of magnetic paths, a winding for each of said pair of magnetic paths and having a voltage induced therein when cut by the magnetic flux in its associated magnetic path, the voltage induced in said other winding of said pair of paths being zero when said first magnetic path is in normal relation thereto, an amplifier individual to and connected to each of said windings, a phase detector, circuit connections from the output of each of said amplifiers to said phase detector, a motor, mechanical connections from said motor to said common support of said pair of magnetic paths, a circuit connection from the output of said phase detector to said motor, and means including circuit connections whereby the output of said phase detector is zero when said one of said pair of magnetic paths is in its normal position with its pole faces directly opposite the pole faces of said first magnetic path, 7. In a power follower, a first magnetic path having pole faces and having flux normally induced in a predetermined direction, means for changing the direction of said pole faces, a pair of magnetic paths having pole faces angularly disposed with respect to each other, the pole faces of one of said pair of magnetic paths and the pole faces of said first magnetic path being normally in operative relation with the pole faces of each directly opposed for completing a magnetic circuit therewith, and the pole faces of the other of said pair of paths and the pole faces of the first path being at right angles simultaneously, a phase detector, means energized by the flux in said pair of magnetic paths for operating said phase detector, a motor for rotating said pair of magnetic paths, circuit connections from the output of said phase detector to said motor, the current in the output of said phase detector being zero when said first magnetic path is in normal position, and means including circuit connections to said phase detector for driving said motor to rotate said magnetic paths in a direction to follow the change in direction of said flux in said first magnetic path.

8. In a power follower, a first magnetic path having flux normally induced in a predetermined direction, means for changing the direction of said flux, a pair of magnetic path means rotatable with respect to the first magnetic path, each having a winding, said magnetic path means being common to both of said paths and being normally in operative relation with said first magnetic path with the pole faces of each in opposed relation for completing a magnetic circuit therewith, and in non-operative relation with the other of said paths, a variable proportion of the flux in said first magnetic circuit extending along said first magnetic path means as the direction of said flux in said first magnetic path is changed, a direct current motor for rotating said pair of magnetic path means, and means including a phase discriminator variably operated in accordance with the change in direction looking counterclockwise of said flux in said first magnetic path and controlled in accordance with the flux in each of said pair of magnetic path means for operating said motor to rotate said paths through an angle and in a direction determined by the change in direction of said flux in said first magnetic path, the circuit arrangement being such that with full amplification of the signal induced in said winding of said first magnetic path, there is no power output from said phase discriminator when no signal is induced in the winding of the other of said pair of magnetic paths.

9. In a power follower, a first magnetic path having flux normally induced in a predetermined direction, means for rotating said path to change the direction of said flux, a pair of magnetic path means rotatable with respect to the first magnetic path, each having a winding, said magnetic path means being normally in operative relation with said first magnetic path with the pole faces of each in opposed relation for completing a magnetic circuit therewith, a variable proportion of the flux in said first magnetic circuit extending along said first magnetic path means as the direction of said flux in said first magnetic path is changed, a direct current motor for rotating said pair of magnetic path means, and means including a phase discriminator variably operated in accordance with the change in direction looking counterclockwise of said flux in said first magnetic path and controlled in accordance with the flux in each of said pair of magnetic path means for operating said motor to rotate said paths through an angle and in a direction determined by the change in direction of said flux in said first magnetic path, the circuit arrangement being such that with full amplification of the signal induced in said winding of said first magnetic path, there is no power output from said phase discriminator when no signal is induced in the winding of the other of said pair of magnetic paths.

10. In a power follower, a movable first winding energizable by electric current, a second and a third winding in electro-magnetic relation with said first winding, the normal physical relation of said second and third windings with respect to said first winding being such that no signal voltage is normally induced from current flowing in said first winding in the second winding and full signal is normally induced in the third winding, and signal voltage is induced in said second winding when said first winding is moved from its normal relation with respect to the other two windings, a common electronic circuit connected to said second and third windings, a motor connected in the output of said electronic circuit, there being no current flowing in said electronic circuit when no signal voltage is induced in said second winding, said electronic circuit supplying operating power to said motor when said first movable winding is moved from its normal relation with respect to said other windings and induces a signal voltage in said second winding, said motor being thereupon operated from power supplied by said electronic circuit to move said first winding to restore it to its normal physical relation with respect to the other two windings.

11. In a power follower, a movable first winding energizable by electric current, a second and a third winding in electro-magnetic relation with said first winding, the normal physical relation of said second and third windings with respect to said first winding being such that no signal voltage is normally induced from current flowing in said first winding in the second winding and full signal voltage is normally induced in the third winding, and signal voltage is induced in said second winding when said first winding is moved from its normal relation with respect to the other two windings, a common electronic circuit connected to said second and third windings, a motor connected in the output of said electronic circuit, there being no current flowing in said electronic circuit when no signal voltage is induced in said second winding, said electronic circuit supplying operating power to said motor when said first movable winding is moved from its normal relation with respect to said other windings and induces a signal current in said second winding, said motor being thereupon operated from power supplied by said electronic circuit to move said first winding to restore it to its normal physical relation with respect to the other two windings, and means including circuit connections from said second and third windings to said electronic circuit whereby one of said latter two windings determines the direction of rotation of said motor and the other of said latter two windings determines the extent of motor rotation.

12. In a power follower, a movable first winding energizable by electric current, a second and a third winding in electro-magnetic relation with said first winding, the normal physical relation of said second and third windings with respect to said first winding being such that no signal voltage is normally induced from current flowing in said first winding in the second winding and full signal voltage is normally induced in the third winding, and signal voltage is induced in said second winding when said first winding is moved from its normal relation with respect to the other two windings, a common electronic circuit connected to said second and third windings, a motor connected in the output of said electronic circuit, there being no current flowing in said electronic circuit when no signal voltage is induced in said second winding, said electronic circuit supplying operating power to said motor when said first movable winding is moved from its normal relation with respect to said other windings and induces a signal voltage in said second winding, said motor being thereupon operated from power supplied by said electronic circuit to move said first winding to restore it to its normal physical relation with respect to the other two windings, said motor being a direct current motor, said electronic circuit output being connected to the armature of said motor, and means including circuit connections from said second and third windings to said electronic circuit whereby the current output from said electronic circuit through said armature is in one direction when said movable winding is moved in one direction and in the opposite direction when the movable winding is moved in the opposite direction.

13. In a power follower, a movable first winding energizable by electric current, a second and a third winding in electro-magnetic relation with said first winding, the normal physical relation of said second and third windings with respect to said first winding being such that no signal current is normally induced from current flowing in said first winding in the second winding and full signal is normally induced in the third winding, and signal current is induced in said second winding when said first winding is moved from its normal relation with respect to the other two windings, a common electronic circuit connected to said second and third windings, a direct current motor connected to the output of said electronic circuit, said electronic circuit having zero current output when full current flows in said third winding and zero current flows in said second winding and having output current flowing in said electronic circuit when current flows in said second winding, the direction of current flow in said motor from said electronic circuit being determined by the phase relation of the currents in said second and third windings.

14. In a power follower, a movable first winding energizable by electric current, a second and a third winding in electro-magnetic relation with said first winding, the normal physical relation of said second and third windings with respect to said first winding being such that no signal voltage is normally induced from current flowing in said first winding in the second winding and full signal voltage is normally induced in the third winding, and signal voltage is induced in said second winding when said first winding is moved from its normal relation with respect to the other two windings, a common electronic circuit connected to said second and third windings, a direct current motor connected to the output of said electronic circuit, said electronic circuit having zero current output when full current flows in said third winding and zero current flows in said second winding and having output current flowing in said electronic circuit when current flows in said second winding, the direction of current in said motor from said electronic circuit being determined by the voltage induced in one of said windings and the extent of rotation of said motor being determined by the voltage induced in the other of said windings.

DAVID E. SUNSTEIN.

REFERENCES CITED

The following references are of record in the file of this patent:

UNITED STATES PATENTS

| Number | Name | Date |
|---|---|---|
| 1,959,805 | Wittkuhns et al. | May 22, 1934 |
| 2,088,659 | Moseley | Aug. 3, 1937 |
| 2,131,759 | Satterlee | Oct. 4, 1938 |
| 2,356,186 | Somers | Aug. 22, 1944 |